(12) United States Patent
Hondou

(10) Patent No.: US 6,760,836 B2
(45) Date of Patent: Jul. 6, 2004

(54) APPARATUS FOR ISSUING AN INSTRUCTION TO A SUITABLE ISSUE DESTINATION

(75) Inventor: Mikio Hondou, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 598 days.

(21) Appl. No.: 09/797,734

(22) Filed: Mar. 5, 2001

(65) Prior Publication Data

US 2002/0019927 A1 Feb. 14, 2002

(30) Foreign Application Priority Data

Aug. 8, 2000 (JP) ......................................... 2000-239667

(51) Int. Cl.[7] .................................................. G06F 9/30
(52) U.S. Cl. .......................................... 712/214; 712/23
(58) Field of Search ................................. 712/214, 215, 712/220, 227, 216, 217, 23; 711/108, 125

(56) References Cited

U.S. PATENT DOCUMENTS

| 5,530,816 A | * | 6/1996 | Holt ............................ 712/217 |
| 5,557,763 A | * | 9/1996 | Senter et al. .................. 712/23 |
| 5,742,782 A | | 4/1998 | Ito et al. ...................... 395/386 |
| 5,742,783 A | | 4/1998 | Azmoodeh et al. ........... 395/388 |
| 5,790,822 A | * | 8/1998 | Sheaffer et al. .............. 712/204 |
| 5,797,025 A | * | 8/1998 | Popescu et al. ................ 712/23 |
| 5,819,308 A | * | 10/1998 | Tien et al. ................... 711/108 |
| 5,832,293 A | * | 11/1998 | Popescu et al. ............... 712/23 |
| 5,864,341 A | * | 1/1999 | Hicks et al. ................. 712/214 |
| 6,237,041 B1 | | 5/2001 | Haag et al. |

FOREIGN PATENT DOCUMENTS

| CA | 2192237 | 5/1997 |
| EP | 0950969 A2 | 10/1999 |
| JP | A-06-342371 | 12/1994 |
| JP | A-07-281896 | 10/1995 |
| WO | WO 02/13031 | 2/2002 |

OTHER PUBLICATIONS

United Kingdom Search Report for Application No. GB0202162.4 dated Oct. 9, 2002.

* cited by examiner

Primary Examiner—Henry W. H. Tsai
(74) Attorney, Agent, or Firm—Staas & Halsey LLP

(57) ABSTRACT

An instruction issuing device comprises a plurality of issue controlling circuits which run in parallel, and perform a control for preferentially issuing an instruction to a particular arithmetic unit. An optimum issue controlling circuit is selected according to the empty quantity of instruction slots for each arithmetic unit or a result of learning of the number of previously issued instructions, and an issue destination is determined based on the direction of the selected circuit.

10 Claims, 14 Drawing Sheets

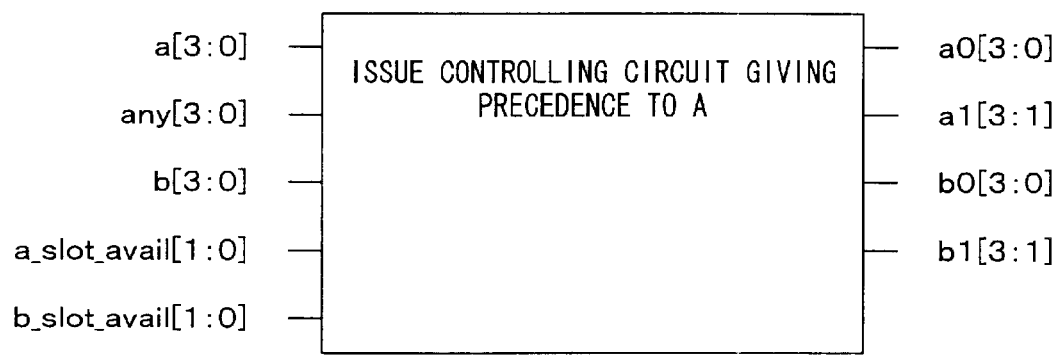
F I G. 4

APPARATUS FOR ISSUING AN INSTRUCTION TO A SUITABLE ISSUE DESTINATION

BACKGROUND OF THE INVENTION

1. Field of the Invention

The present invention relates to an instruction issuing device which controls the issue of an instruction to a plurality of arithmetic units of different types, and issues an instruction to a suitable issue destination.

2. Description of the Related Art

In a processor having a plurality of arithmetic units whose feasible operation types are different, there may be cases where an instruction that can be issued only to an arithmetic unit of a particular type, and an instruction that can be issued to arithmetic units of several types coexist. In the processor having such an architecture, the issue destination of an instruction is determined by an issue controlling circuit.

FIG. 1A shows the issue control performed by a conventional issue controlling circuit. For ease of explanation, considered here is the case where four instructions can be simultaneously issued, and an arithmetic unit that performs an operation of a type A and an arithmetic unit that performs an operation of a type B exist.

In FIG. 1A, an issue latch 1 comprises 4 instruction slots for holding fetched instructions. An issue controlling circuit 2 controls the issue of the instructions held by the issue latch 1 "in order". Reservation stations 3 and 4 respectively comprise a plurality of instruction slots for holding the entries of instruction waiting to be processed, and passes the entries to arithmetic units 5 and 6 "out of order".

Here, "in order" means that instructions are processed in an order directed by a program, whereas "out of order" means that instructions are processed in an order different from that directed by a program.

The arithmetic unit 5 performs an operation of a type A, and the reservation station 3 holds the entries of instructions that can be executed by the arithmetic unit 5. In the meantime, the arithmetic unit 6 performs an operation of a type B, and the reservation station 4 holds the entries of instructions that can be executed by the arithmetic unit 6.

The issue controlling circuit 2 performs a control for preferentially selecting the arithmetic unit of the type A as an issue destination of an instruction, and issues to the arithmetic unit 5 an instruction (any instruction) that can be issued to both of the types A and B as far as possible.

With such a control, an any instruction is issued to the arithmetic unit 5 of the type A in a fixed manner if this instruction is included as a first instruction (Slot 0) or a second instruction (Slot 1) in the issue latch 1. Additionally, if the any instruction is included as a third (Slot 2) or subsequent instruction, and if an empty quantity (the number of empty slots) of the reservation station 3 of the type A is 0, this instruction is issued to the arithmetic unit 6 of the type B.

In FIG. 1A, the empty quantities of the reservation stations 3 and 4 are respectively 1 and 2, and an any instruction, A instruction, B instruction, and other instruction are respectively held in Slots 0 through 3 of the issue latch 1. The A instruction is an instruction that can be issued only to the arithmetic unit of the type A. The B instruction is an instruction that can be issued only to the arithmetic unit of the type B.

At this time, since the first any instruction is issued to the arithmetic unit 5 in a fixed manner, the empty quantity of the reservation station 3 results in 0. Therefore, the issue controlling circuit 2 waits until the slot of the reservation station 3 becomes empty, and issues the second A instruction to the arithmetic unit 5.

FIG. 1B shows an issue stage of instruction pipeline processing. This issue stage is composed of two durations T1 and T2. The issue controlling circuit 2 determines the issue destination of an instruction in consideration of a preferential issue destination in the duration T1, and performs a postprocess in the duration T2 after the issue destination is determined.

However, because the issue controlling circuit 2 shown in FIG. 1A issues instructions in order, it cannot issue the third and subsequent instructions until the second A instruction is issued, although the reservation station 4 of the type B has an empty slot.

As described above, if the number of empty slots for an arithmetic unit at a preferential issue destination becomes small when the issue controlling circuit whose preferential issue destination is predetermined, the number of instructions that can be simultaneously issued becomes small.

Therefore, a method selecting the issue destination of an any instruction from among a plurality of arithmetic units without predetermining a preferential issue destination is considered. In this case, to determine the optimum issue destination of the any instruction, it is necessary to calculate the empty quantities of slots of the plurality of arithmetic units, and to select an issue destination which maximizes the number of instructions that can be simultaneously issued.

FIG. 1C shows the issue stage in which such a control is performed. This issue stage includes a duration T3 corresponding to a newly added determining circuit in addition to the durations T1 and T2 shown in FIG. 1B. This determining circuit calculates the empty quantities of slots of a plurality of arithmetic units, and determines an optimum preferential issue destination at that time. The issue controlling unit performs the operations of the durations T1 and T2 based on the determined preferential issue destination.

However, considering the empty quantities of a plurality of reservation stations and the types of instructions, the number of their combinations is very large. Therefore, it is difficult to quickly obtain an optimum solution in one pipeline stage. If the issue destination of each instruction is strictly determined, the operations in the durations T1 and T3 become more complicated, so that the time required for one stage becomes long and the processing speed is deteriorated.

SUMMARY OF THE INVENTION

An object of the present invention is to provide an instruction issuing device which can determine, for a relatively short time, an issue destination which maximizes the number of instructions that can be simultaneously issued.

An instruction issuing device according to the present invention comprises a plurality of issue controlling circuits, a comparing circuit, a learning circuit, a register circuit, a selecting circuit and an issuing circuit.

The issue controlling circuit performs a control for preferentially issuing an instruction (any instruction) that can be issued to any of a plurality of arithmetic units which perform operations of different types, and determine an issue destination arithmetic unit in parallel. Especially, if a given instruction is an any instruction, each of the issue controlling circuits specifies an arithmetic unit at a preferential issue destination as an issue destination. As a result, a plurality of issue destinations are independently determined for the single given instruction.

In a first aspect of the present invention, a comparing circuit makes a comparison among the empty quantities of instruction slots for a plurality of arithmetic units, and outputs a result of the comparison. A selecting circuit selects one of the plurality of issue controlling circuits based on the result of the comparison. The issuing circuit issues an instruction to an issue destination arithmetic unit specified by the selected issue controlling circuit.

In a second aspect of the present invention, a learning circuit learns a preferential issue destination according to a pattern of an instruction sequence to be issued, and stores learning information indicating the preferential issue destination. The selecting circuit selects one of a plurality of issue controlling circuits based on the learning information. The issuing circuit issues an instruction included in the instruction sequence to the issue destination arithmetic unit specified by the selected issue controlling circuit.

In a third aspect of the present invention, a register circuit stores preferential issue destination information specified by a register write instruction. A selecting circuit selects one of a plurality of issue controlling circuits based on the preferential issue destination information. The issuing circuit issues an instruction to the issue destination arithmetic unit specified by the selected issue controlling circuit.

BRIEF DESCRIPTION OF THE DRAWINGS

FIG. 4 shows a first issue controlling circuit;

DESCRIPTION OF THE PREFERRED EMBODIMENTS

Hereinafter, preferred embodiments according to the present invention will be described in detail by referencing the drawings.

Figure 2A:
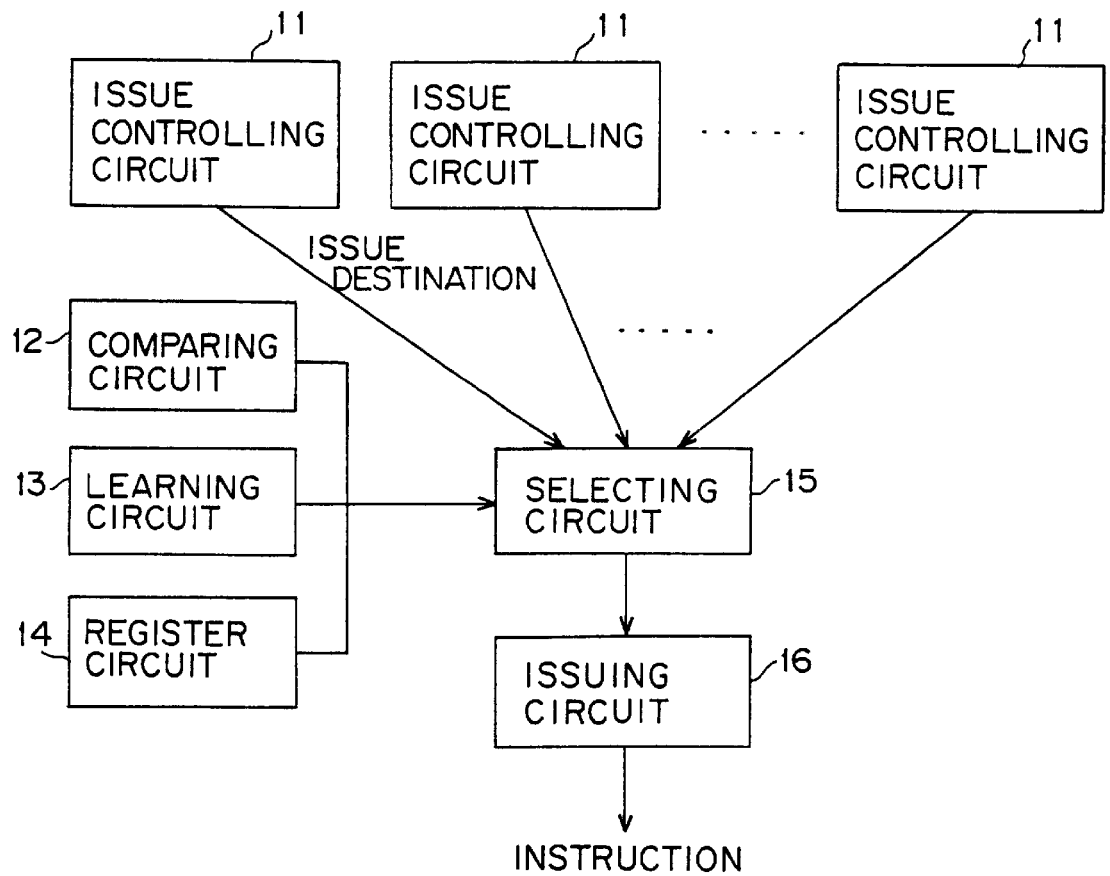
FIG. 2A shows the principle of an instruction issuing device according to the present invention.

FIG. 2A shows the principle of an instruction issuing device according to the present invention. The instruction issuing device according to the present invention comprises a plurality of issue controlling circuits 11, a comparing circuit 12, a learning circuit 13, a register circuit 14, a selecting circuit 15, and an issuing circuit 16.

The issue controlling circuit 11 performs a control for preferentially issuing an instruction (any instruction) that can be issued to any of a plurality of arithmetic units performing operations of different types, and determines an issue destination arithmetic unit in parallel. Especially, if a given instruction is an any instruction, each issue controlling circuit 11 specifies the arithmetic unit at a preferential issue destination as an issue destination. As a result, a plurality of issue destinations are independently determined for the single given instruction.

In the first aspect of the present invention, a comparing circuit 12 makes a comparison among the empty quantities of instruction slots for a plurality of arithmetic units, and outputs a result of the comparison. A selecting circuit 15 selects one of a plurality of issue controlling circuits 11 based on the result of the comparison. An issuing circuit 16 issues an instruction to the issue destination arithmetic unit specified by the selected issue controlling circuit 11.

The comparing circuit 12 outputs the result of the comparison of a largeness/smallness relationship among the empty quantities of instruction slots to the selecting circuit 15. The selecting circuit 15 selects a corresponding issue controlling circuit 11 based on the largeness/smallness relationship among the empty quantities, and passes the issue destination specified by the selected issue controlling circuit 11 to the issuing circuit 16. Consequently, an instruction is issued from the issuing circuit 16 to the arithmetic unit at that issue destination.

With such an instruction issuing device, it becomes possible to select the issue controlling circuit 11 that specifies as a preferential issue destination an arithmetic unit having a maximum empty quantity among a plurality of arithmetic units. As a result, an any instruction is issued to the arithmetic unit having the maximum empty quantity of instruction slots, whereby the number of instructions that can be simultaneously issued increases. Since the issue controlling circuits 11 run in parallel, the time required to determine an issue destination is almost the same as a conventional time.

Additionally, in the second aspect of the present invention, a learning circuit 13 learns a preferential issue destination according to the pattern of an instruction sequence to be issued, and stores learning information indicating the preferential issue destination. A selecting circuit 15 selects one of a plurality of issue controlling circuits 11 based on the learning information. An issuing circuit 16 issues an instruction included in the instruction sequence to the issue destination arithmetic unit specified by the selected issue controlling circuit 11.

The learning circuit 13 learns to which arithmetic unit an instruction is to be preferentially issued in correspondence with the pattern of a given instruction sequence, and outputs the learning information specifying the arithmetic unit at the preferential issue destination to the selecting circuit 15. The selecting circuit 15 selects a corresponding issue controlling circuit 11 based on the preferential issue destination, and passes the issue destination specified by the selected issue controlling circuit 11 to the issuing circuit 16.

With such an instruction issuing device, the learning circuit 13 can learn a suitable preferential issue destination, and the selecting circuit 15 can select the issue controlling circuit 11 having such a preferential issue destination. As a result, an any instruction can be issued to a suitable arithmetic unit, thereby increasing the number of instructions that can be simultaneously issued.

In the third aspect of the present invention, a register circuit 14 stores preferential issue destination information specified by a register write instruction. A selecting circuit 15 selects one of a plurality of issue controlling circuits 11 based on the preferential issue destination information. Then, an issuing circuit 16 issues an instruction to the issue destination arithmetic unit specified by the selected issue controlling circuit 11.

The register write instruction specifies to which arithmetic unit an instruction is to be preferentially issued. The register circuit 14 stores specified preferential issue destination information, and outputs this information to the selecting circuit 15. The selecting circuit 15 selects a corresponding issue controlling circuit 11 based on the preferential issue destination, and passes the issue destination specified by the selected issue controlling circuit 11 to the issuing circuit 16.

With such an instruction issuing device, the register circuit 14 can specify a suitable preferential issue destination in all cases, and the selecting circuit 15 can select an issue controlling circuit 11 having such a preferential issue destination. As a result, an any instruction is issued to a suitable arithmetic unit, whereby the number of instructions that can be simultaneously issued increases.

Figure 3:
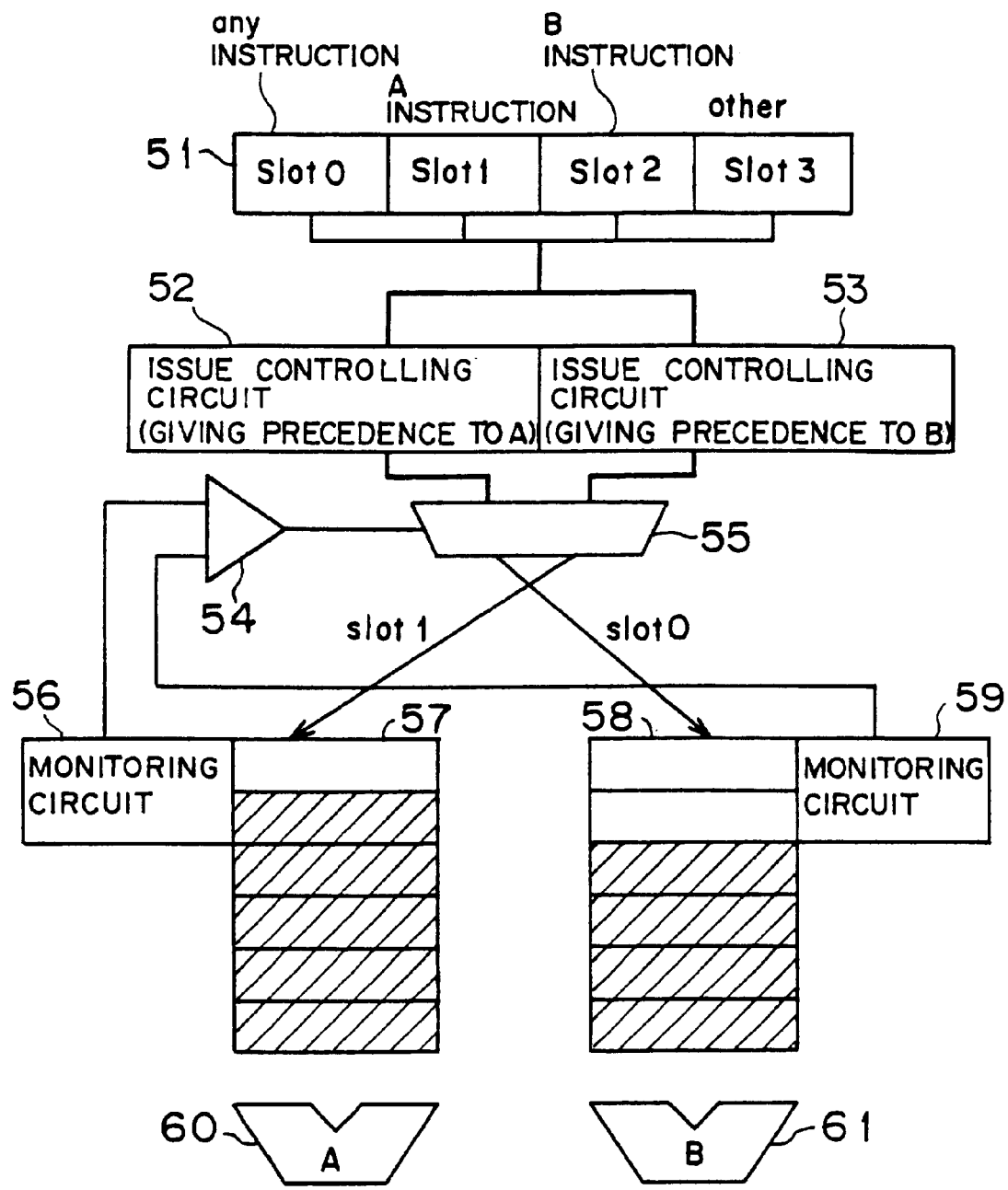
FIG. 3 shows a first issue unit.
Figure 6:
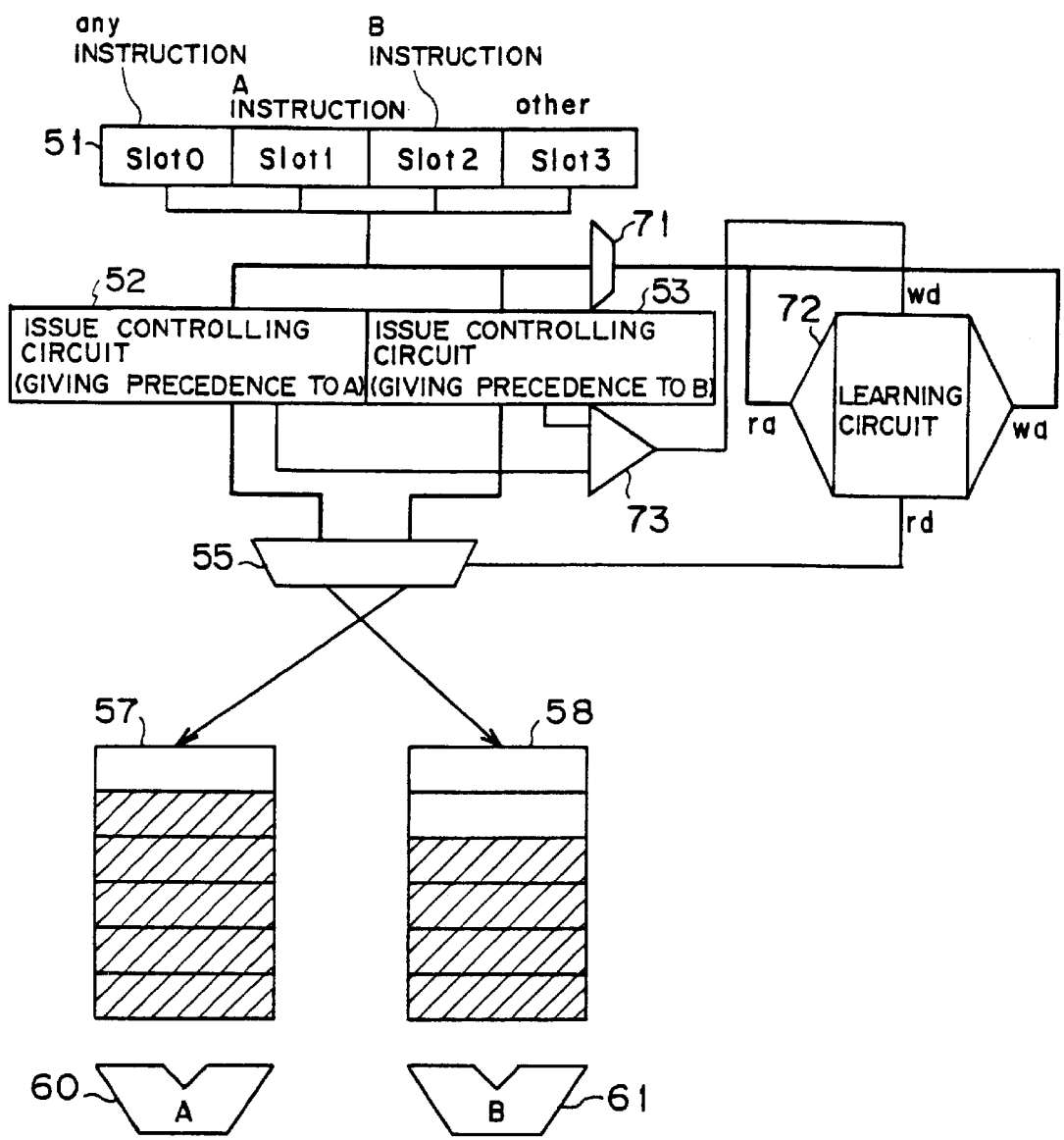
FIG. 6 shows a second issue unit.
Figure 10:
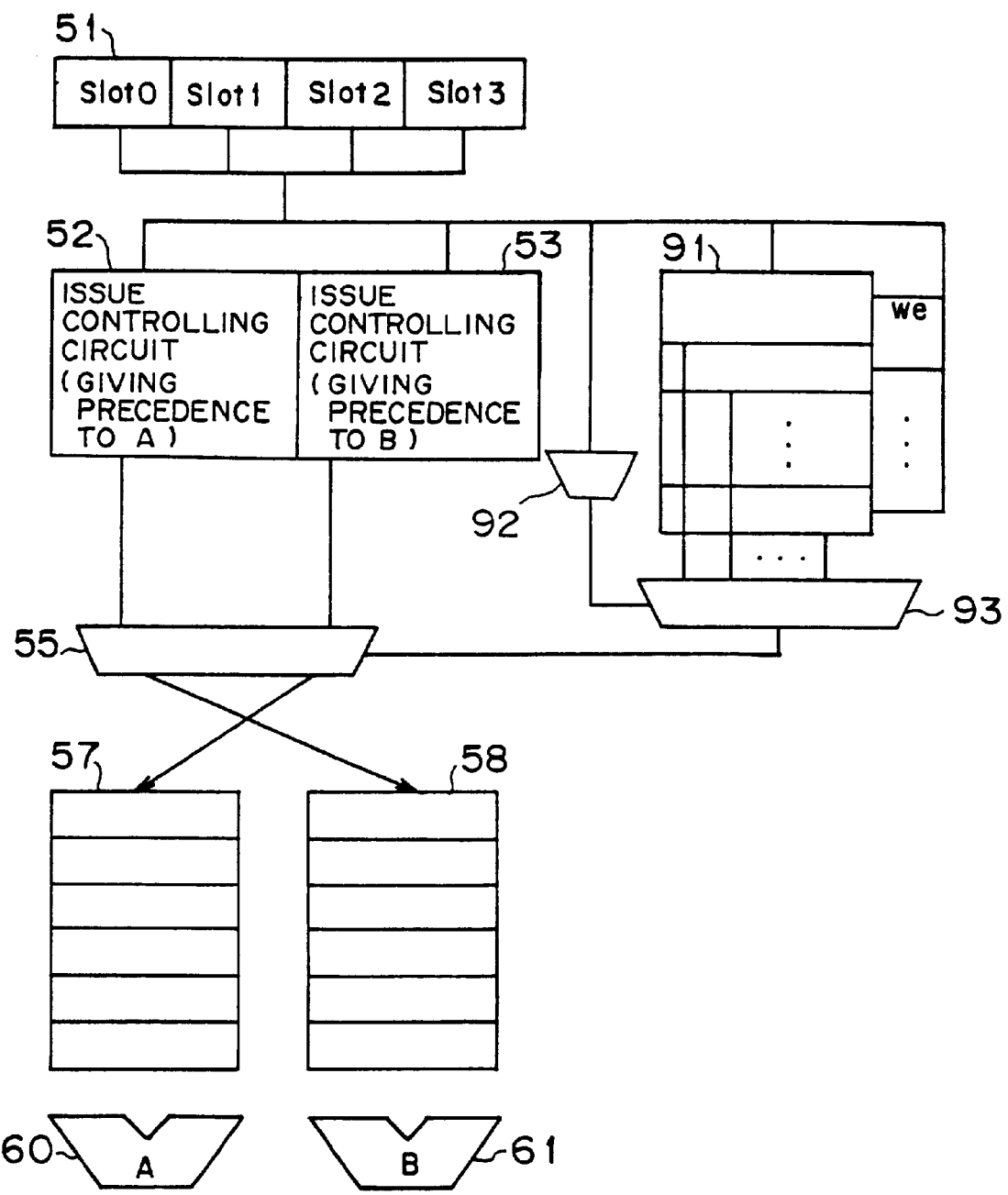
FIG. 10 shows a sixth issue unit.

For example, each of the issue controlling circuits 11 shown in FIG. 2A corresponds to an issue controlling circuit 52 or 53 which is shown in FIG. 3 and will be described later, and the comparing circuit 12 corresponds to a comparing circuit 54 shown in FIG. 3. The learning circuit shown in FIG. 2A corresponds to an encoder 71, a learning circuit 62, and a comparing circuit 73, which are shown in FIG. 6 and will be described later. The register circuit 14 corresponds to a control register 91, an encoder 92, and a multiplexer 93, which are shown in FIG. 10 and will be described later. The selecting circuit 15 and the issuing circuit 16, which are shown in FIG. 2A, correspond to a multiplexer 55 shown in FIG. 3.

Figure 2B:
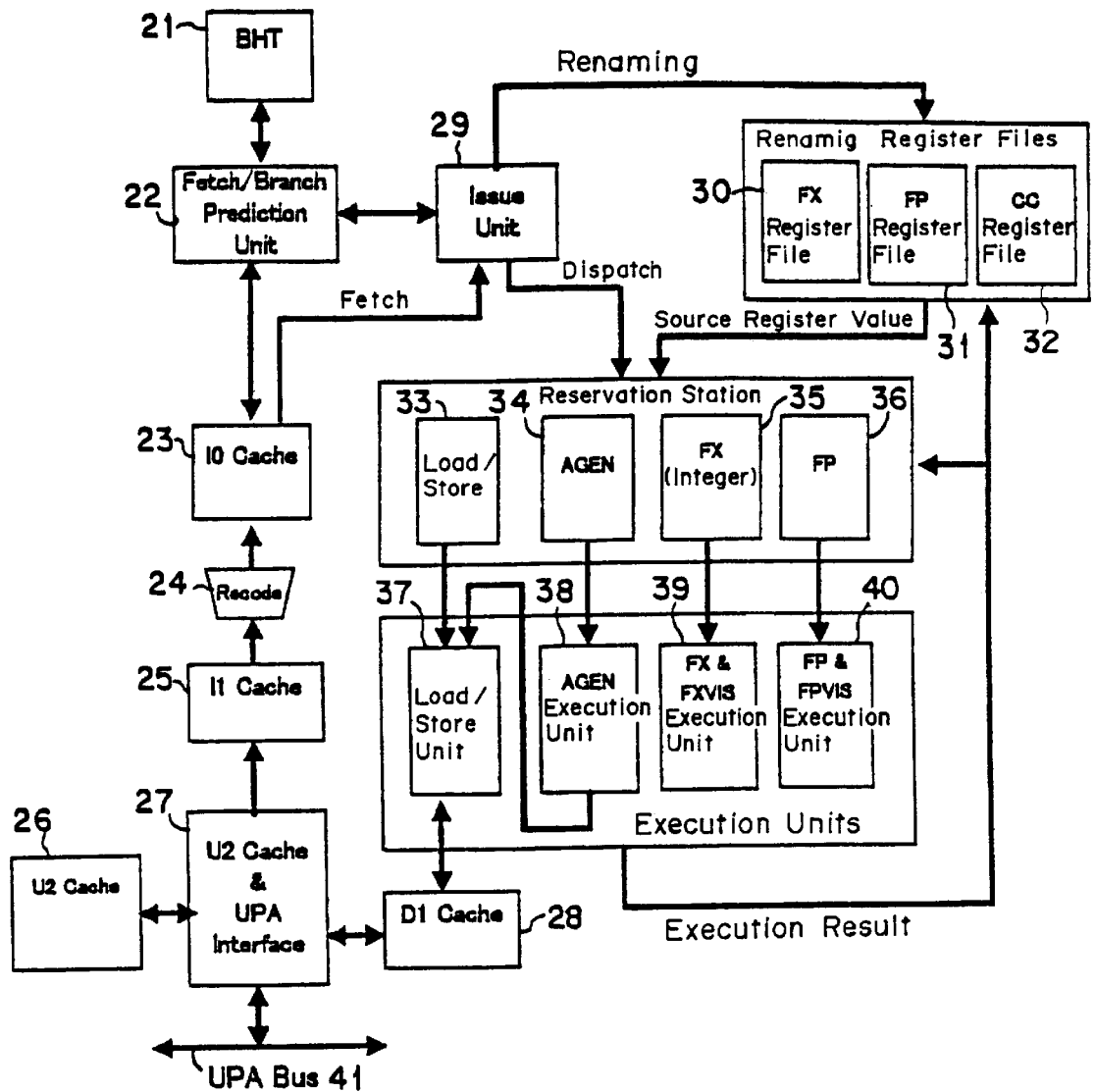
FIG. 2B shows the configuration of a processor.

FIG. 2B shows the configuration of a processor comprising the instruction issuing device according to this preferred embodiment. The processor shown in FIG. 2B comprises a branch history table (BHT) 21, a fetch/branch prediction unit 22, a level-0 instruction cache (IO Cache) 23, a recode unit 24, a level-1 instruction cache (I1 Cache) 25, a level-2 cache (U2 Cache) 26, an interface 27, a level-1 data cache (D1 Cache) 28, an issue unit 29, register files 30, 31, and 32, reservation stations 33, 34, 35, and 36, and execution units 37, 38, 39, and 40.

The interface 27 controls the input/output of information to/from the level-2 cache 26 and a UPA (UltraSPARC Port Architecture) bus 41, and provides the level-1 instruction cache 25 with an instruction. The UPA bus 41 is connected to a memory via a system controller not shown.

The recode unit 24 decodes the instruction held by the level-1 instruction cache 25, and passes the decoded instruction to the level-0 instruction cache 23. The fetch/branch prediction unit 22 fetches the instruction of the level-0 instruction cache 23, passes the fetched instruction to the issue unit 29, and predicts the branch destination of a branch instruction by referencing the branch history table 21.

The issue unit 29 dispatches the fetched instruction to the reservation stations 33, 34, 35, and 36. The register files 30, 31, and 32 are used to rename the registers. The FX register file 30, the FP register file 31, and the CC register file 32 are register files of fixed-point operation data, a floating-point operation data, and a condition code respectively.

The reservation stations 33, 34, 35, and 36 respectively comprise a plurality of slots, and hold the entries of instructions executed by the execution units 37, 38, 39, and 40. The load/store unit 37 loads/stores data via the level-1 data cache 28.

The AGEN execution unit 38 includes an arithmetic unit generating a load/store address. The FX&FXVIS execution unit 39 includes an arithmetic unit performing a fixed-point operation. The FP&FPVIS execution unit 40 includes an arithmetic unit performing a floating-point operation. The AGEN execution unit 38 and the FX&FXVIS execution unit 39 among these execution units can perform an integer operation. An instruction that can be issued to both of these units is an any instruction.

The issue unit 29 comprises a plurality of issue controlling circuits running in parallel, and a selection circuit switching among the outputs of the issue controlling circuits. Each of the issue controlling circuits performs a control for preferentially issuing an instruction to each of a plurality of arithmetic units whose feasible operation types are different. The selection circuit selects an optimum one of the plurality of issue controlling circuits according to the empty quantities of instruction slots for the arithmetic units and a learning result of the number of previously issued instructions, and determines an issue destination based on the output of the selected issue controlling circuit.

As described above, a plurality of issue controlling circuits having different preferential issue destinations are arranged, and an output of any of the issue controlling circuits is dynamically selected when an instruction is issued, thereby decreasing the possibility that issue destinations concentrate on one arithmetic unit. Accordingly, the number of instructions that can be simultaneously issued increases, leading to an improvement in the instruction processing speed.

Next, the configuration of the issue unit 29 is described in further detail by referencing FIGS. 3 through 10.

FIG. 3 exemplifies a first configuration of the issue unit 29 shown in FIG. 2B. In this example, the issue unit 29 comprises an issue latch 51, issue controlling circuits 52 and 53, a comparing circuit 54, and a multiplexer 55. Additionally, reservation stations 57 and 58 correspond, for example, to the reservation stations 34 and 35 shown in FIG. 2B. Arithmetic units 60 and 61 correspond, for example, to the execution units 38 and 39 shown in FIG. 2B.

The issue latch 51 comprises 4 slots for holding the instructions fetched by the fetch/branch prediction unit 22. The issue controlling circuits 52 and 53 are arranged in parallel to the issue latch 51, and control the issue of the instructions held by the issue latch 51 in order.

The arithmetic units 60 and 61 respectively perform the operations of types A and B. The reservation stations 57 and 58 respectively hold the entries of instructions that can be executed by the arithmetic units 60 and 61. Here, one arithmetic unit is shown for each of the reservation stations. Normally, however, one or more arithmetic units are arranged for each reservation station.

The issue controlling circuits 52 and 53 perform a control for selecting the arithmetic unit of the type A and B respectively as a preferential issue destination, and issues an any instruction, which can be issued to both of the types A and B, to the preferential issue destination as far as possible.

Monitoring circuits 56 and 59 respectively monitor the empty quantities of instruction slots of the reservation stations 57 and 58. The comparing circuit 54 makes a comparison between the empty quantities of the reservation stations 57 and 58 based on the signals output from the monitoring circuits 56 and 59, and outputs a result of the comparison to the multiplexer 55 as a selection signal. The multiplexer 55 selects either of the outputs of the issue controlling circuits 52 and 53 according to the received selection signal, and issues an instruction to the specified issue destination.

At this time, the comparing circuit 54 outputs a selection signal for selecting the output of the issue controlling circuit 52 if the empty quantity of the reservation station 57 is larger than that of the reservation station 58. Or, if the empty quantity of the reservation station 58 is larger than that of the reservation station 57, the comparing circuit 54 outputs a signal for selecting the output of the issue controlling circuit 53. If the empty quantities of both of the reservation stations are the same, the comparing circuit 54 outputs a selection signal for selecting either of the outputs.

With such a configuration, the comparison between the empty quantities of the two reservation stations is made when an instruction is issued, and an issue controlling circuit having a preferential issue destination that is an arithmetic unit having a larger empty quantity is automatically selected. As a result, an any instruction is preferentially issued to an arithmetic unit having a larger empty quantity, whereby the number of instructions that can be issued increases as a whole.

Figure 1A:
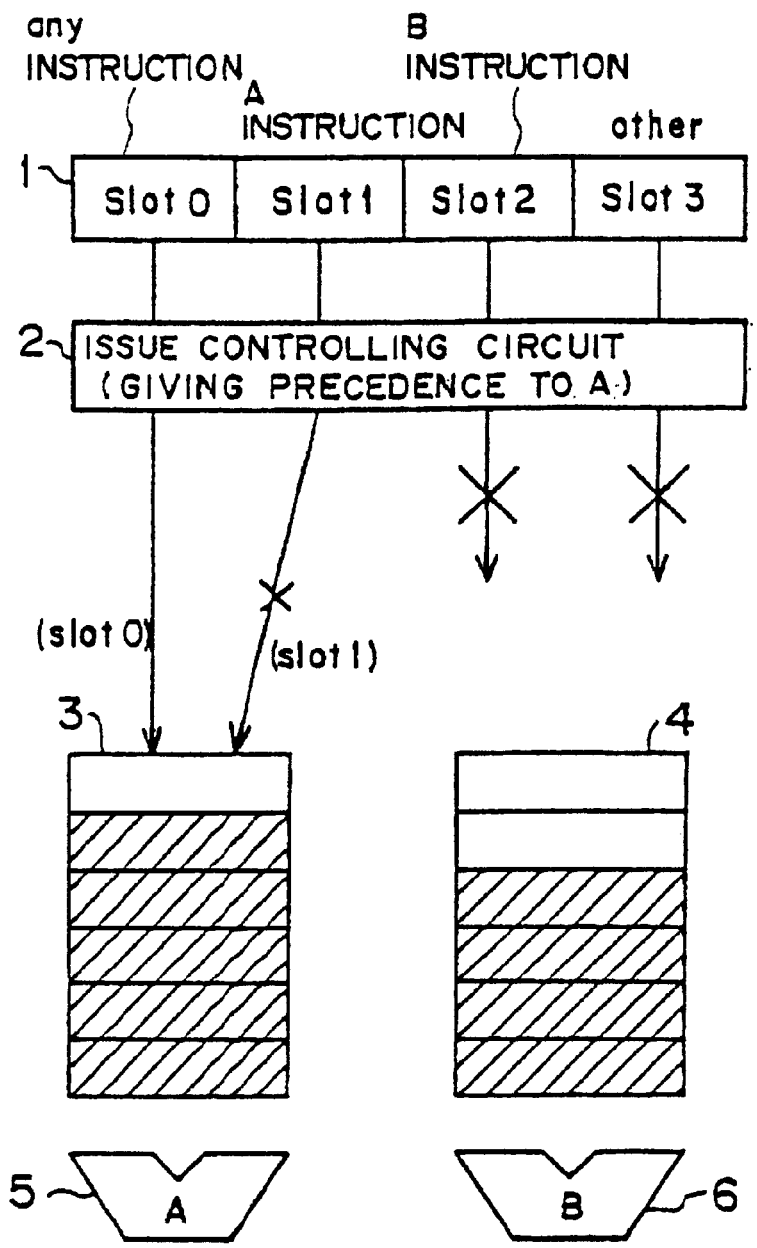
FIG. 1A shows a conventional issue control.
Figure 1B:
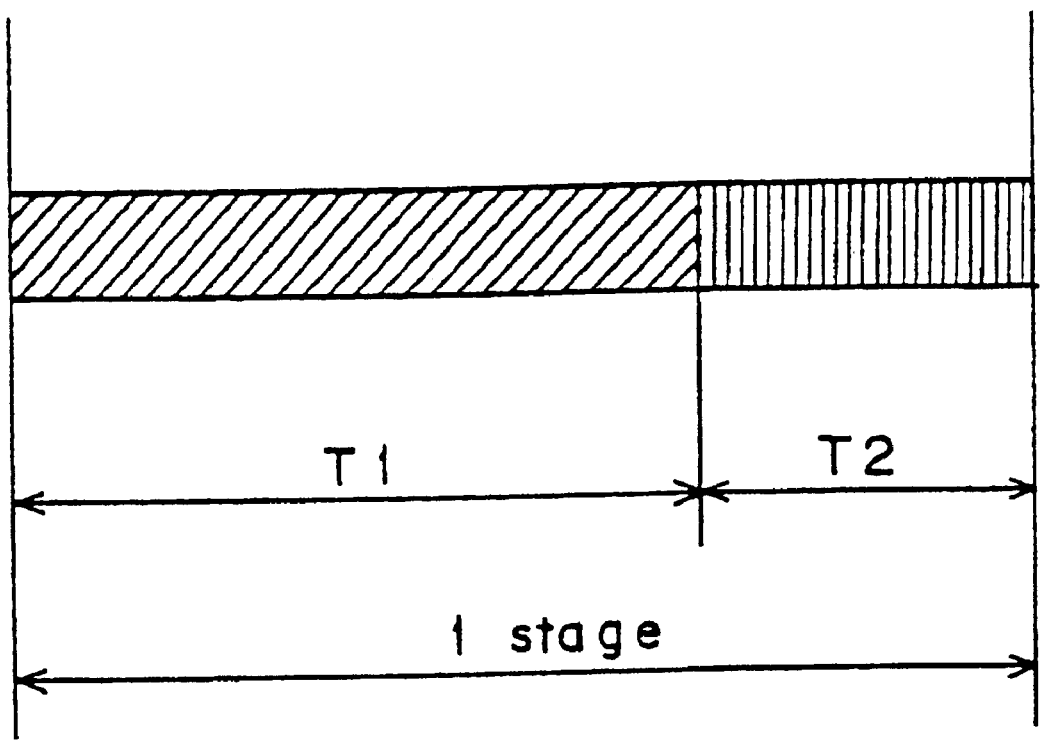
FIG. 1B shows a conventional issue stage.
Figure 1C:
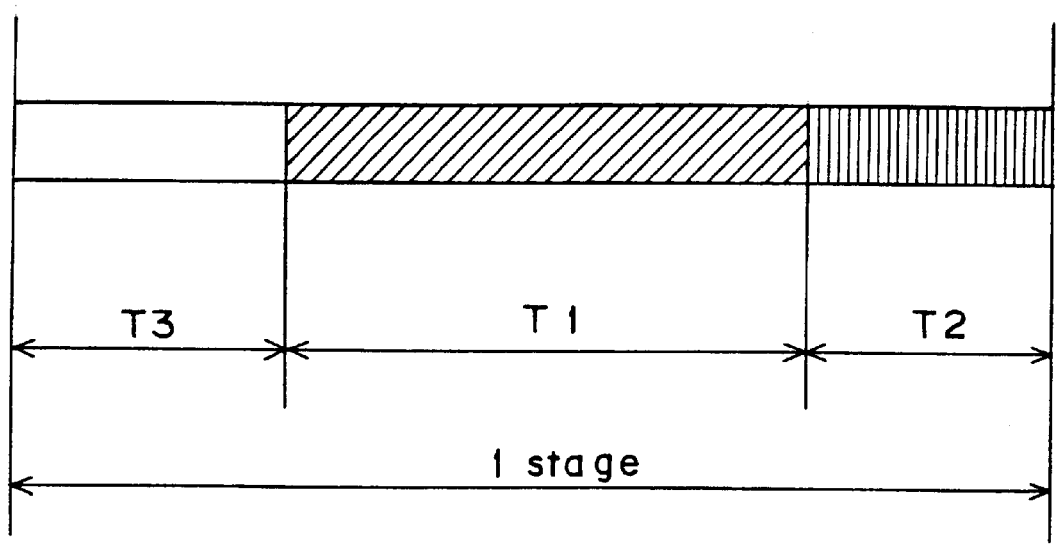
FIG. 1C shows a modified issue stage.

Since the empty quantities of the reservation stations 57 and 58 are respectively 1 and 2 in FIG. 3, the output of the issue controlling circuit 53 is selected. The first any instruction within the issue latch 51 is therefore issued to the arithmetic unit 61, and the second A instruction and the third B instruction are respectively issued to the arithmetic units 60 and 61. Accordingly, the issue of the A and B instructions does not delay as in the case shown in FIG. 1A.

Furthermore, the issue controlling circuits 52 and 53 are arranged in parallel, and the multiplexer 55 is arranged at their succeeding stage, thereby reducing the complicatedness of issue control and an increase in delay due to a circuit addition to a minimum (increase due to one stage of the multiplexer).

Each of the monitoring circuits 56 and 59 generates, for example, a 4-bit valid signal slot_avail [3:0], which represents the empty quantity of the reservation station 57 or 58, and outputs this signal to the comparing circuit 54. The empty quantity of slots is represented with this signal as follows.

empty quantity 0: slot_avail[3:0]=0000
empty quantity 1: slot_avail[3:0]=0001
empty quantity 2: slot_avail[3:0]=0011
empty quantity 3: slot_avail[3:0]=0111
empty quantity 4: slot_avail[3:0]=1111

Assume that the signals output from the monitoring circuits 56 and 59 are respectively a_slot_avail[3:0] and b_slot_avail[3:0]. In this case, the comparing circuit 54 generates a selection signal a_greater_than_b, for example, with the following logic operation.

a_greater_than_b=
(a_slot_avail[3] & ~b_slot_avail[3])|
(a_slot_avail[2] & ~b_slot_avail[2])|
(a_slot_avail[1] & ~b_slot_avail[1])|
(a_slot_avail[0] & ~b_slot_avail[0])

With such a logic operation, the selection signal a_greater_than_b becomes a logic 1 if the empty quantity of the reservation station 57 is larger than that of the reservation station 58, and becomes a logic 0 if the empty quantity of the reservation station 57 is equal to or smaller than that of the reservation station 58. Accordingly, the multiplexer 55 can be controlled with this selection signal.

FIG. 4 shows a specific example of the issue controlling circuit 52 shown in FIG. 3. A 4-bit input signal a[3:0] represents the presence/absence (logic 1 or 0) of an instruction that can be issued only to the arithmetic unit 60 in each slot of the issue latch 51, whereas an input signal b[3:0] represents the presence/absence of an instruction that can be issued only to the arithmetic unit 61 in a similar manner. Additionally, an input signal any[3:0] represents the presence/absence of an any instruction that can be issued to both of the arithmetic units 60 and 61.

2-bit input signals a_slot_avail[1:0] and b_slot_avail [1:0] respectively represent the empty quantities of the reservation stations 57 and 58. To determine an issue destination, it is sufficient to recognize the empty quantities of the reservation stations within a range of the restricted number of instructions that can be simultaneously issued to each arithmetic unit. If the empty quantity exceeding the restricted number is identified, instructions the number of which corresponds to the empty quantity cannot be issued simultaneously. Therefore, it is meaningless.

Here, the bits [1:0] of the signals a_slot_avail and b_slot_avail are input to the issue controlling circuit 52 under the restriction such that the maximum number of instructions which can be simultaneously issued to each of the arithmetic units is 2. By referencing these 2-bit signals, it can be identified whether the empty quantities are either 0, 1, or 2 or more.

Furthermore, an output signal a0[3:0] represents the position of the slot of the instruction within the issue latch 51, which is assigned to a write port 0 for the arithmetic unit 60, and an output signal a1[3:1] represents the position of the slot of the instruction within the issue latch 51, which is assigned to a write port 1 for the arithmetic unit 60. Similarly, output signals b0[3:0] and b1[3:1] respectively represent the positions of slots of the instructions within the issue latch 51, which are assigned to write ports 0 and 1 for the arithmetic unit 61.

These write ports are arranged on the input sides of the reservation stations 57 and 58, and the output signal of the issue controlling circuit 52 is used to select the instruction assigned to each of the write ports of the respective arithmetic units. Accordingly, the arithmetic unit which becomes the issue destination of an instruction is decided according to these output signals, and the instruction is assigned to a corresponding write port. For example, the following signals are input to the issue controlling circuit 52 in the state shown in FIG. 3.

a[3:0]=0010
b[3:0]=0100
any[3:0]=0001
a_slot_avail[1:0]=01
b_slot_avail[1:0]=11

The issue controlling circuit 52 then determines the issue destination of the any instruction by giving precedence to the type A, and generates the following output signals.

a0[3:0]=0001
a1[3:1]=001
b0[3:0]=0100
b1[3:1]=000

Figure 5:
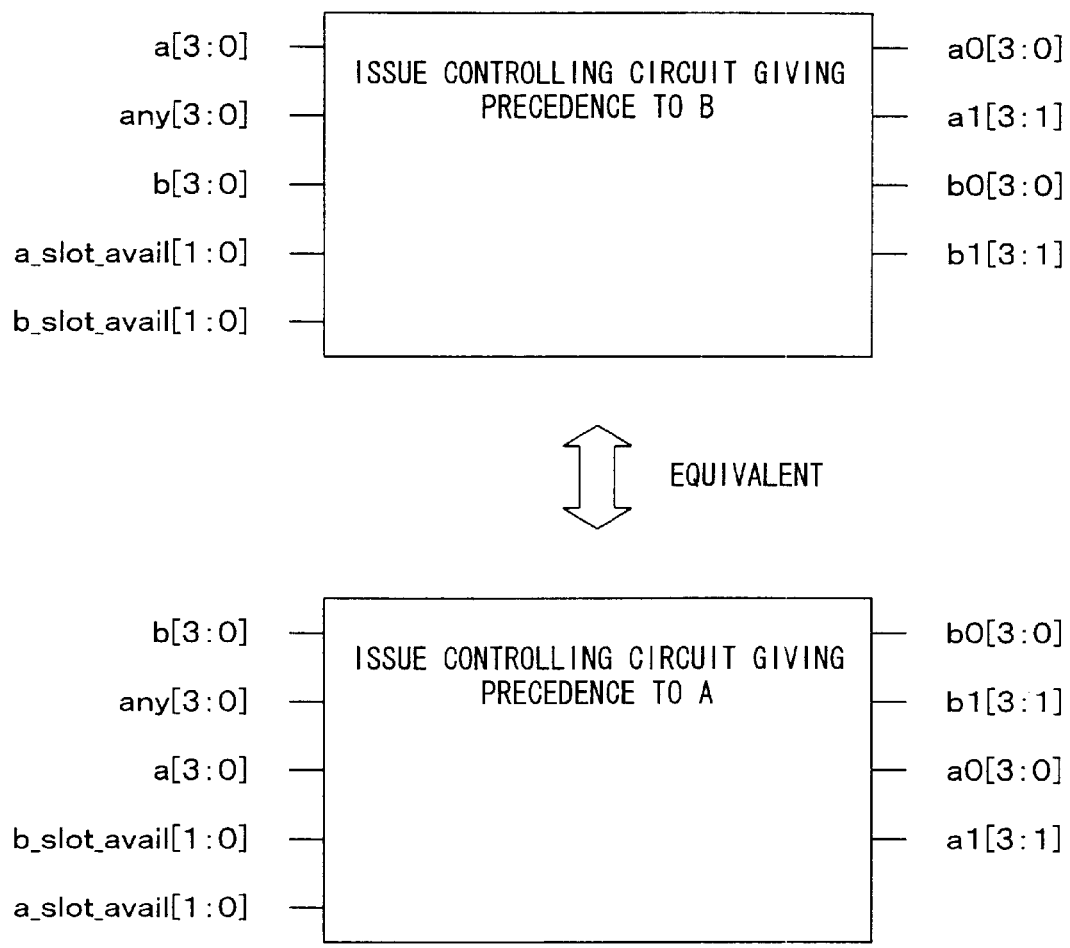
FIG. 5 shows a second issue controlling circuit.

FIG. 5 shows a specific example of the issue controlling circuit 53 shown in FIG. 3. The issue controlling circuit 53 is implemented by replacing the input and output signals of the issue controlling circuit 52 which give precedence to the type A as shown in FIG. 5. When the above described input signals are given, the issue controlling circuit 53 determines the issue destination of the any instruction by giving precedence to the type B, and generates the following output signals.

a0[3:0]=0010
a1[3:1]=000
b0[3:0]=0001
b1[3:1]=010

FIG. 6 exemplifies a second configuration of the issue unit 29 shown in FIG. 2B. In this example, the issue unit 29 comprises an issue latch 51, issue controlling circuits 52 and 53, a multiplexer 55, an encoder 71, a learning circuit 72, and a comparing circuit 73.

The encoder 71 encodes each instruction held by the issue latch 51, and outputs the encoded instruction as a read address ra or a write address wa of the learning circuit 72. The comparing circuit 73 makes a comparison between the numbers of instructions that can be simultaneously issued from the issue controlling circuits 52 and 53 based on the signals output from the issue controlling circuits 52 and 53, and outputs a result of the comparison to the learning circuit 72 as write data wd.

The learning circuit 72 is configured by a memory circuit. This circuit writes the data wd to the address wa, and outputs the read data rd read from the address ra to the multiplexer 55 as a selection signal. The multiplexer 55 selects either of the outputs of the issue controlling circuits 52 and 53 according to the received selection signal.

At this time, the comparing circuit 73 outputs the value of the selection signal for selecting the output of the issue controlling circuit 52 as the data wd, if the number of instructions that can be issued by the issue controlling circuit 52 is larger than that of the issue controlling circuit 53. If the number of instructions that can be issued by the issue controlling circuit 53 is larger than that of the issue controlling circuit 52, the comparing circuit 73 outputs the value of the selection signal for selecting the output of the issue controlling circuit 53 as the data wd. Or, if both of the numbers of the instructions are the same, the comparing circuit 73 outputs the value of the signal for selecting either of the outputs.

With such a configuration, the value of the selection signal, which is intended to issue a larger number of instructions simultaneously, is stored in the learning circuit 72 as learning information according to the pattern of an instruction sequence held by the issue latch 51. Additionally, previous learning information corresponding to the same pattern of the instruction sequence of the issue latch 51 is extracted from the learning circuit 72, and output to the multiplexer 55 as a selection signal. In this way, the issue destination of the any instruction is selected according to a previous learning result.

If the number of instructions that can be issued from each issue controlling circuit does not change much, for the instruction sequence of the same pattern, the number of instructions that can be issued increases as a whole by using a learning result. Also a delay of issue control can be that of one stage of the multiplexer in a similar manner as in the case of FIG. 3.

In FIG. 6, the instruction sequence of an any instruction, A instruction, B instruction, and other instruction is held by the issue latch 51. In this case, the encoder 71 encodes, for example, the respective instructions as follows.

other instruction: 00
A instruction: 01
B instruction: 10
any instruction: 11

If the address ra is generated by arranging the outputs of the encoder 71, which correspond to the instruction sequence of the issue latch 51, in an order of Slot 3, Slot 2, slot 1, and Slot 0, 00100111 is obtained. Then, the learning information stored in the corresponding entry within the learning circuit 72 is extracted, and the output of the issue controlling circuit is selected based on the extracted information. As a result, the any instruction is issued to the preferential issue destination of the selected issue controlling circuit.

At this time, the value of the selection signal for selecting the output of the issue controlling circuit 52 or 53, with which a larger number of instructions can be issued, is stored in the corresponding entry within the learning circuit 72 by using 00100111 as the address wa. Consequently, the learning information corresponding to the pattern of this instruction sequence is updated.

Each of the issue controlling circuits 52 and 53 generates, for example, a 4-bit valid signal issue_valid[3:0], which represents the number of instructions that can be issued, and outputs this signal to the comparing circuit 73. With this signal, the number of instructions that can be issued is represented as follows.

the number of instructions 0: issue_valid[3:0]=0000
the number of instructions 1: issue_valid[3:0]=0001
the number of instructions 2: issue_valid[3:0]=0011
the number of instructions 3: issue_valid[3:0]=0111
the number of instructions 4: issue_valid[3:0]=1111

Assuming that the signals output from the issue controlling circuits 52 and 53 are respectively n1_issue_valid[3:0] and n2_issue_valid[3:0], the comparing circuit 73 generates learning information n1_greater_than_n2, for example, with the following logic operation.

n1_greater_than_n2=
(n1_issue_valid[3] & ~n2_issue_valid[3])|
(n1_issue_valid[2] & ~n2_issue_valid[2])|
(n1_issue_valid[1] & ~n2_issue_valid[1])|
(n1_issue_valid[0] & ~n2_issue_valid[0])

With such a logic operation, the learning information n1_greater_than_n2 becomes a logic 1 if the number of instructions that can be issued by the issue controlling circuit 52 is larger than that of the issue controlling circuit 53, and becomes a logic 0 if the number of instructions that can be issued by the issue controlling circuit 52 is equal to or smaller than that of the issue controlling circuit 53. Accordingly, the multiplexer 55 can be controlled by using this learning information as a selection signal.

Figure 7:
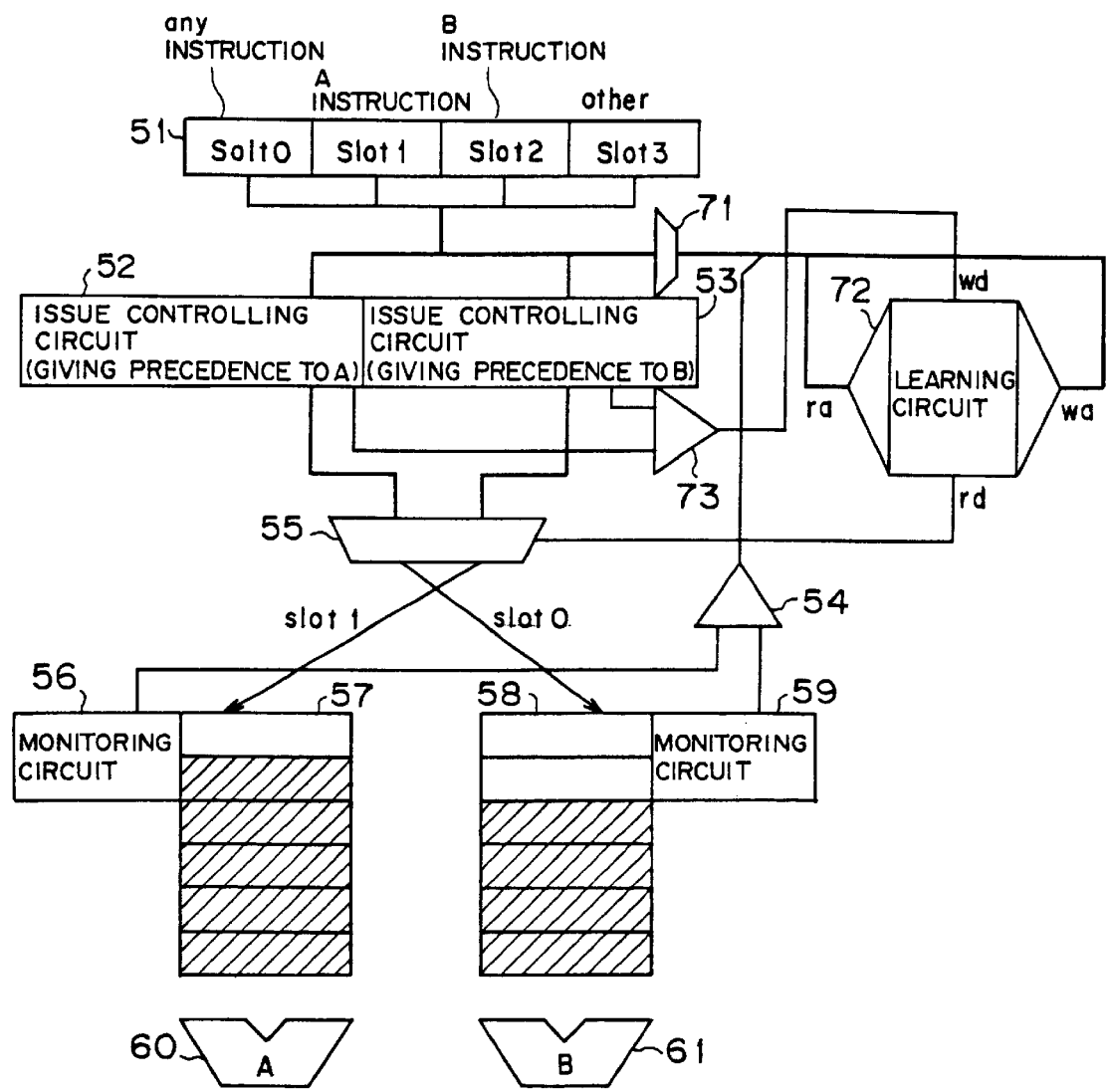
FIG. 7 shows a third issue unit.

FIG. 7 exemplifies a third configuration of the issue unit 29 shown in FIG. 2B. In this example, the issue unit 29 is configured by combining the circuits shown in FIGS. 3 and 6, and comprises an issue latch 51, issue controlling circuits 52 and 53, a multiplexer 55, comparing circuits 54 and 73, an encoder 71, and a learning circuit 72.

In this case, a combination of the information about the pattern of an instruction sequence, which is output from the encoder 71, and a result of the comparison between the empty quantities, which is output from the comparing circuit 54, are used as the addresses ra and wa of the learning circuit 72. Additionally, the result of the comparison output from the comparing circuit 73 is used as learning information in a similar manner as in the case of FIG. 6.

Here, since the empty quantity of the reservation station 58 is larger than that of the reservation station 57, the signal a_greater_than_b output from the comparing circuit 54 becomes a logic 0. If this signal value is added to MSB (Most Significant Bit) side of the address 00100111 of FIG. 6, 000100111 is obtained. As a result, this address 000100111 is used to extract and update the learning information as the addresses ra and wa.

With such a configuration, if the largeness/smallness relationship between the empty quantities of the reservation stations is different although the patterns of instruction sequences are the same, learning information is stored at a different address. Accordingly, learning also in consideration of the largeness/smallness relationship between the empty quantities can be performed. As a result, the number of instructions that can be issued would be larger than that with the configuration shown in FIG. 6. An issue control delay is similar to that in the case shown in FIG. 6.

Figure 8:
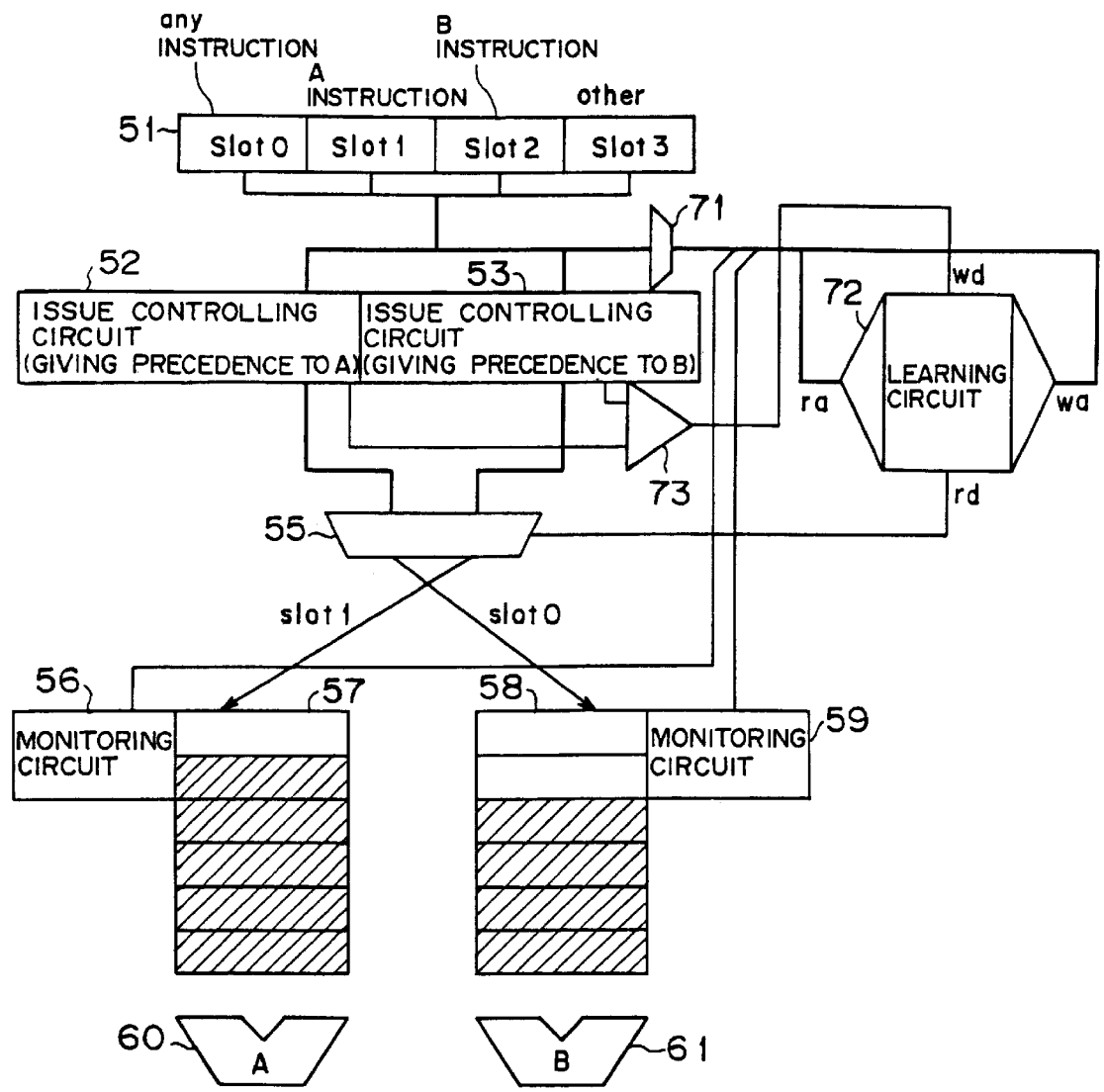
FIG. 8 shows a fourth issue unit.

FIG. 8 exemplifies a fourth configuration of the issue unit 29 shown in FIG. 2B. In this example, the issue unit 29 comprises the configuration shown in FIG. 7, from which the comparing circuit 54 is excluded. In this case, a combination of the information about the pattern of an instruction sequence, which is output from the encoder 71, and the information about the empty quantity, which is output from the monitoring circuits 56 and 57, is used as the addresses ra and wa of the learning circuit 72.

Here, the signals a_slot_avail[3:0] and b_slot_avail [3:0] output from the monitoring circuits 56 and 59 are added unchanged to the address 00100111 shown in FIG. 6. Accordingly, the addresses ra and wa are represented by 16 bits.

With such a configuration, learning information is stored at a different address if the empty quantities themselves are different although the result of the comparison between the empty quantities of the reservation stations is the same. Accordingly, more detailed learning than that in the configuration shown in FIG. 7 can be implemented, whereby the number of instructions that can be issued increases.

In the learning circuit 72 shown in FIGS. 6 through 8, 1-bit learning information corresponding to the selection signal of the multiplexer 55 is used. However, also strength information of 1 bit or more may be added to hold more detailed learning information.

Figure 9:
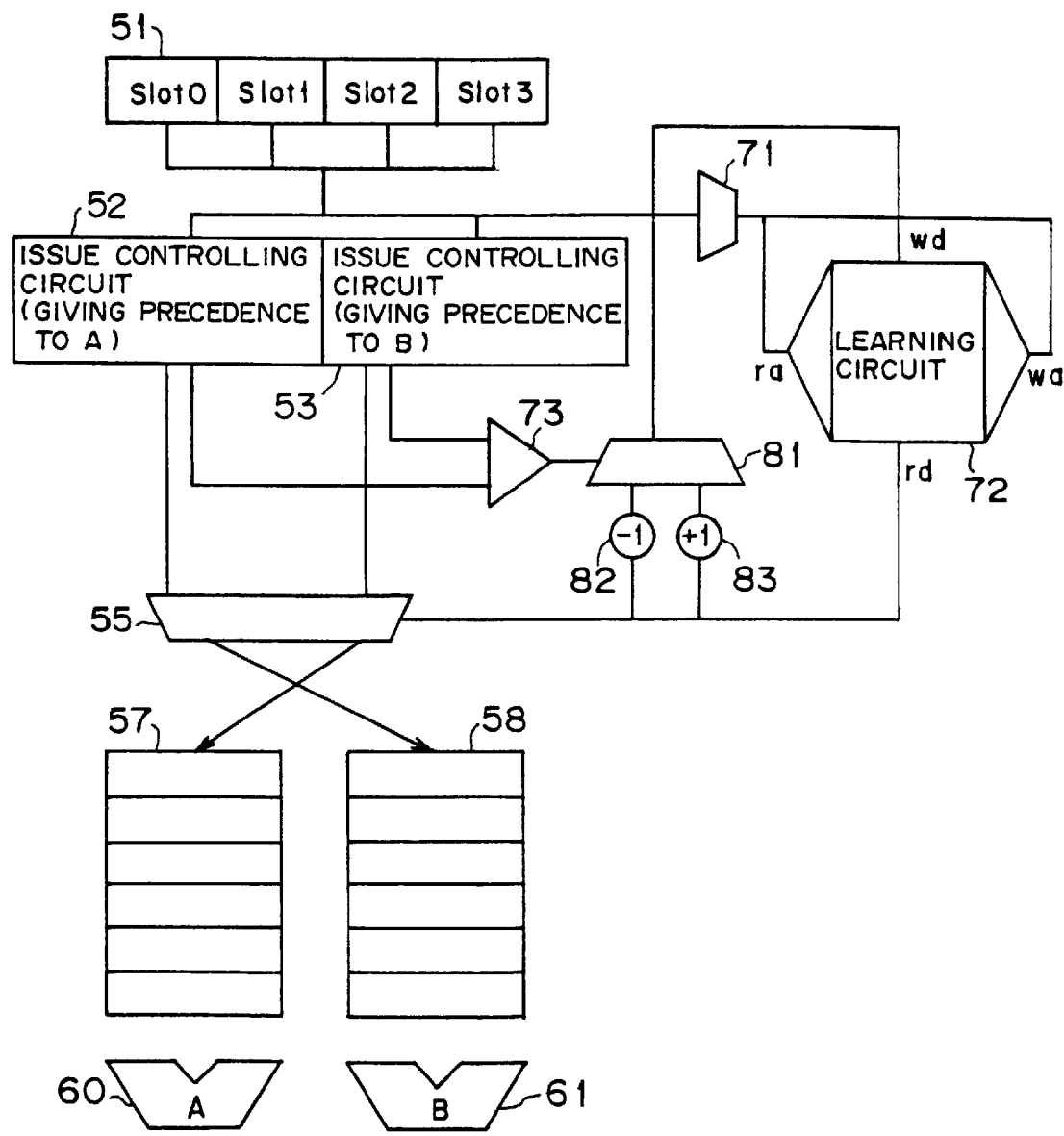
FIG. 9 shows a fifth issue unit.

FIG. 9 exemplifies a fifth configuration of the issue unit 29 using such strength information. In this example, a multiplexer 81, a subtracter 82, and an adder 83 are added to the configuration shown in FIG. 6. The learning circuit 72 holds 2-bit learning information composed of 1-bit preferential issue destination information and 1-bit strength information. Assuming that the preferential issue destination information and the strength information are respectively MSB and LSB (Least Significant Bit), the meaning of the learning information is assigned as follows.

11: Issuing an instruction to an arithmetic unit of a type A with strong preference.

10: Issuing an instruction to the arithmetic unit of the type A with weak preference.

01: Issuing an instruction to an arithmetic unit of a type B with weak preference.

00: Issuing an instruction to the arithmetic unit of the type B with strong preference.

Only the preferential issue destination information of the MSB among the 2 bits is used as the selection signal of the multiplexer 55. If the preferential issue destination information is a logic 1 or 0, the output of the issue controlling circuit 52 or 53 is selected. To update the learning information, both of the bits are used.

The comparing circuit 73 outputs a logic 1, for example, if the number of instructions that can be issued by the issue controlling circuit 52 is larger than that of the issue controlling circuit 53, and outputs a logic 0 if the number of instructions that can be issued by the issue controlling circuit 52 is equal to or smaller than that of the issue controlling circuit 53. These outputs are used as the selection signal of the multiplexer 81.

The subtracter 82/adder 83 decrements/increments the 2-bit data rd output from the learning circuit 72 by 1, and outputs the data to the multiplexer 81. If the learning information becomes lower than 00 or larger than 11, the data is clipped to 00 or 11.

The multiplexer 81 selects the output of the adder 83 if the selection signal output from the comparing circuit 73 is the logic 1, and outputs the selected output to the learning circuit 72 as the data wd. If the selection signal is the logic 0, the multiplexer 81 selects the output of the subtracter 82, and outputs the selected output as the data wd.

With such a configuration, learning information in an entry selected according to the pattern of an instruction sequence within the issue latch 51 is incremented if the issue controlling circuit 52 can issue a larger number of instructions. In other cases, the learning information in that entry is decremented. Accordingly, previous learning information is updated in a manner of a strength addition so as to increase the number of instructions that can be issued. As a result, it becomes easier to select either of the two issue controlling circuits 52 and 53, which maximizes the number of instructions that can be issued.

In this case, previous learning information can be again used as learning information by modifying the previous information in stages, unlike the configuration shown in FIG. 6. Here, the example where the strength information is added to the configuration shown in FIG. 6 was referred to. However, circuits generating strength information can be added also to the configurations shown in FIGS. 7 and 8 in a similar manner.

FIG. 10 exemplifies a sixth configuration of the issue unit 29 shown in FIG. 2B. In this example, the issue unit 29 comprises an issue latch 51, issue controlling circuits 52 and 53, a multiplexer 55, a control register 91, an encoder 92, and a multiplexer 93.

The control register 91 holds preferential issue destination information for each any instruction, and is used to control the operations of the multiplexer 55. The encoder 92 encodes the pattern of an instruction sequence, and outputs the encoded pattern to the multiplexer 93. The multipelxer 93 uses the output of the encoder 92 as a selection signal, selects the preferential issue destination information of a corresponding control register 91, and outputs the selected information as the selection signal of the multiplexer 55.

In this case, a compiler generates an instruction code (register write instruction) which appropriately rewrites the information of the control register 91 based on a scheduling result of an optimized instruction sequence, so that the number of instructions that can be simultaneously issued becomes a maximum. A write enable signal we and write data are generated from the register write instruction, and the preferential issue destination information specified by the signal we is overwritten with the write data.

With such a configuration, switching between preferential issue destinations is made according to the pattern of an instruction sequence of an executed program in a software manner. As a result, the issue destination of an any instruction is optimized, whereby the number of instructions that can be issued increases as a whole. An issue control delay is similar to that in the examples of the other configurations. Additionally, a plurality of any instructions may be grouped into arbitrary types, and preferential issue information may be stored in the control register 91 for each group.

Figure 11:
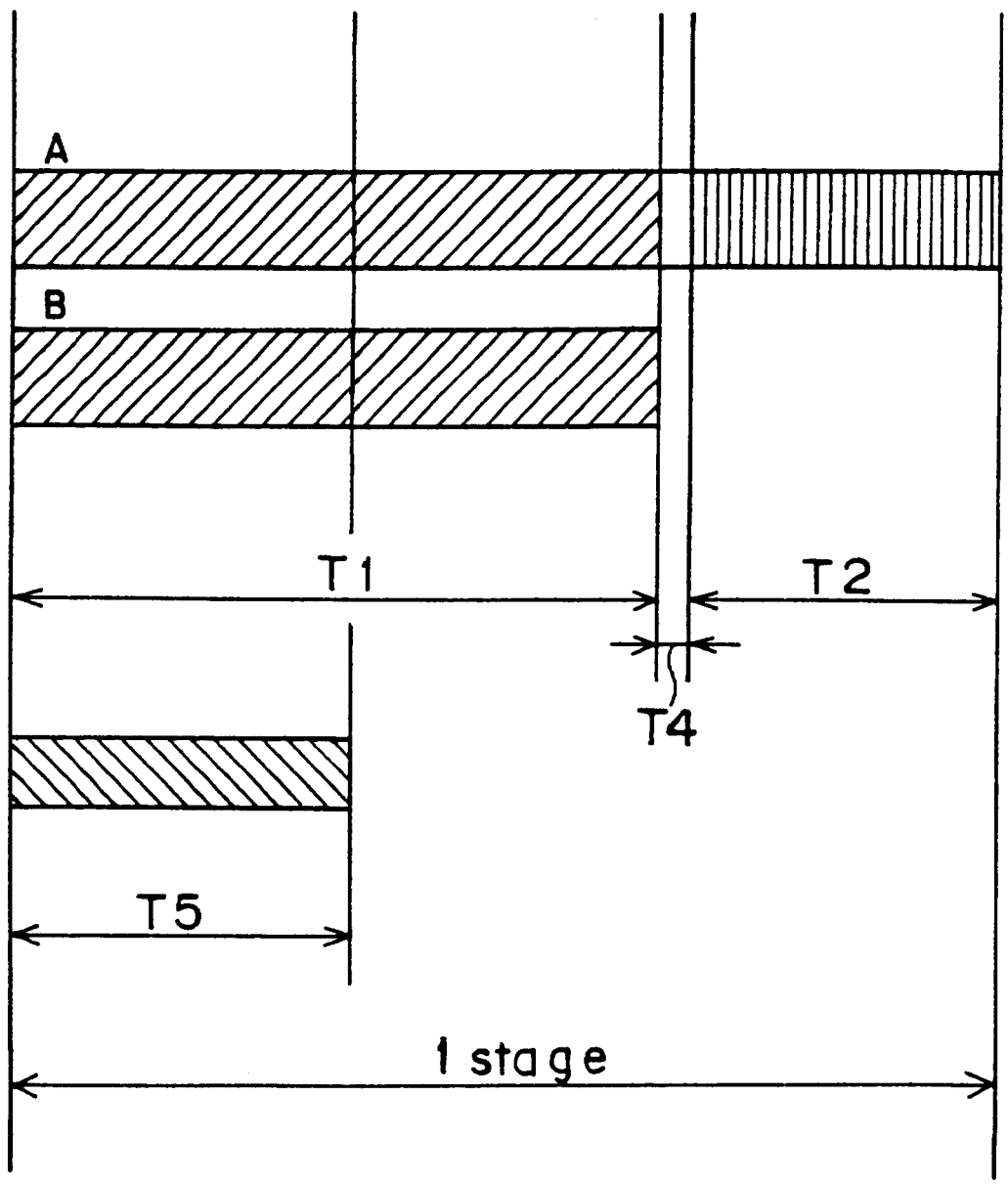
FIG. 11 shows an issue stage according to the present invention.

FIG. 11 shows the issue stage of an instruction according to the present invention. This issue stage includes durations T4 and T5 in addition to the durations T1 and T2 of the issue stage shown in FIG. 1B. The issue controlling circuits 52 and 53 determine the issue destination of an instruction in parallel in consideration of their preferential issue destinations in the duration T1.

In the duration T5 in parallel to the duration T1, it is determined which of the issue controlling circuits 52 and 53 is to be selected. In the duration T4, the multiplexer 55 selects the output according to the selection signal. Since the duration T4 is shorter than the durations T1 and T2, the length of one pipeline stage is almost the same as that in the case shown in FIG. 1B.

The above described preferred embodiment refers to the issue control of an any instruction that can be executed by two types of arithmetic units. However, similar control can be applied also to an any instruction that can be executed by more types of arithmetic units.

In this case, 3 or more issue controlling circuits that respectively have 3 types or more of arithmetic units as their preferential issue destinations may be arranged in parallel, and one of these outputs may be selected by the multiplexer 55. As the selection signal of the multiplexer 55, a signal of a plurality of bits is used, and the comparing circuits 54 and 73 output a signal corresponding to the maximum value resultant from the comparison between 3 or more input values.

According to the present invention, a preferential issue destination of an instruction that can be issued to any of a plurality of arithmetic units of different types is automatically selected based on an empty quantity of instruction slots for each arithmetic unit or a learning result. As a result, the issue destination of an instruction, which increases the number of instructions that can be simultaneously issued, can be determined for a short time.

What is claimed is:

1. An apparatus for issuing an instruction, comprising:
a plurality of issue controlling circuits performing a control for preferentially issuing to one of a plurality of arithmetic units, which perform operations of different types, an instruction that can be issued to any of the plurality of arithmetic units, and determining an issue destination arithmetic unit in parallel;
a comparing circuit making a comparison among empty quantities of instruction slots for the plurality of arithmetic units, and outputting a result of the comparison;
a selecting circuit selecting one of said plurality of issue controlling circuits based on the result of the comparison; and
an issuing circuit issuing an instruction to an issue destination arithmetic unit specified by the selected issue controlling circuit.

2. An apparatus for issuing an instruction, comprising:
a plurality of issue controlling circuits performing a control for preferentially issuing to one of a plurality of arithmetic units, which perform operations of different types, an instruction that can be issued to any of the plurality of arithmetic units, and determining an issue destination arithmetic unit in parallel;
a learning circuit learning a preferential issue destination according to a pattern of an instruction sequence to be issued, and storing learning information indicating the preferential issue destination;
a selecting circuit selecting one of said plurality of issue controlling circuits based on the learning information; and
an issuing circuit issuing an instruction included in the instruction sequence to an issue destination arithmetic unit specified by the selected issue controlling circuit.

3. The apparatus according to claim 2, further comprising
a comparing circuit making a comparison among empty quantities of instruction slots for the plurality of arithmetic units, and outputting a result of the comparison, wherein
said learning circuit learns a preferential issue destination according to a combination of the pattern of the instruction sequence and the result of the comparison.

4. The apparatus according to claim 2, wherein
said learning circuit learns a preferential issue destination according to a combination of the pattern of the instruction sequence and the empty quantities of the instruction slots for the plurality of arithmetic units.

5. The apparatus according to claim 2, wherein
said learning circuit stores learning information including strength information of the preferential issue destination, and updates the learning information to make it easy to select an issue controlling circuit having a maximum number of instructions that can be issued from among said plurality of issue controlling circuits.

6. An apparatus for issuing an instruction, comprising:
a plurality of issue controlling circuits performing a control for preferentially issuing to one of a plurality of arithmetic units, which perform operations of different types, an instruction that can be issued to any of the plurality of arithmetic units, and determining an issue destination arithmetic unit in parallel;
a register circuit storing preferential issue destination information specified by a register write instruction;
a selecting circuit selecting one of said plurality of issue controlling circuits based on the preferential issue destination information; and
an issuing circuit issuing an instruction to an issue destination arithmetic unit specified by the selected issue controlling circuit.

7. The apparatus according to claim 6, further comprising
a generating circuit generating a register write instruction which rewrites the preferential issue destination information so that a number of instructions that can be simultaneously issued becomes a maximum.

8. An apparatus for issuing an instruction, comprising:
a plurality of issue controlling means for performing a control for preferentially issuing to one of a plurality of arithmetic units, which perform operations of different types, an instruction that can be issued to any of the plurality of arithmetic units, and determining an issue destination arithmetic unit in parallel;
a comparing means for making a comparison among empty quantities of instruction slots for the plurality of arithmetic units, and outputting a result of the comparison;
a selecting means for selecting one of said plurality of issue controlling means based on the result of the comparison; and
an issuing means for issuing an instruction to an issue destination arithmetic unit specified by the selected issue controlling means.

9. An apparatus for issuing an instruction, comprising:
a plurality of issue controlling means for performing a control for preferentially issuing to one of a plurality of arithmetic units, which perform operations of different types, an instruction that can be issued to any of the plurality of arithmetic units, and determining an issue destination arithmetic unit in parallel;
a learning means for learning a preferential issue destination according to a pattern of an instruction sequence to be issued, and storing learning information indicating the preferential issue destination;
a selecting means for selecting one of said plurality of issue controlling means based on the learning information; and
an issuing means for issuing an instruction included in the instruction sequence to an issue destination arithmetic unit specified by the selected issue controlling means.

10. An apparatus for issuing an instruction, comprising:

a plurality of issue controlling means for performing a control for preferentially issuing to one of a plurality of arithmetic units, which perform operations of different types, an instruction that can be issued to any of the plurality of arithmetic units, and determining an issue destination arithmetic unit in parallel;

a register means for storing preferential issue destination information specified by a register write instruction;

a selecting means for selecting one of said plurality of issue controlling means based on the preferential issue destination information; and an issuing means for issuing an instruction to an issue destination arithmetic unit specified by the selected issue controlling means.

* * * * *

UNITED STATES PATENT AND TRADEMARK OFFICE
CERTIFICATE OF CORRECTION

PATENT NO. : 6,760,836 B2
DATED : July 6, 2004
INVENTOR(S) : Mikio Hondou

It is certified that error appears in the above-identified patent and that said Letters Patent is hereby corrected as shown below:

Title page,
Item [54], Title, change "APPARATUS FOR ISSUING INSTRUCTION TO A SUITABLE ISSUE DESTINATION" to -- APPARATUS HAVING ISSUE CONTROLLING CIRCUITS ISSUING AN INSTRUCTION TO A SUITABLE ISSUE DESTINATION --
Item [56], References Cited, U.S. PATENT DOCUMENTS, "6,237,041, 5/2001, Haag et al." to -- 6,237,041, 05/2001, Haal et al. --

Signed and Sealed this

Twenty-first Day of December, 2004

JON W. DUDAS
*Director of the United States Patent and Trademark Office*